United States Patent
Ito

(10) Patent No.: US 6,575,578 B2
(45) Date of Patent: Jun. 10, 2003

(54) PROJECTOR

(75) Inventor: Yoshitaka Ito, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/169,357

(22) PCT Filed: Oct. 31, 2001

(86) PCT No.: PCT/JP01/09576

§ 371 (c)(1),
(2), (4) Date: Jul. 1, 2002

(87) PCT Pub. No.: WO02/37180

PCT Pub. Date: May 10, 2002

(65) Prior Publication Data

US 2003/0058410 A1 Mar. 27, 2003

(30) Foreign Application Priority Data

Oct. 31, 2000 (JP) ........................ 2000-331929

(51) Int. Cl.[7] .............................. G03B 21/00
(52) U.S. Cl. ............................ 353/37; 353/77
(58) Field of Search ................ 353/74, 77, 79, 353/98, 99, 30, 31, 37

(56) References Cited

U.S. PATENT DOCUMENTS 5,666,171 A 9/1997 Nakamura et al.

FOREIGN PATENT DOCUMENTS

| EP | 0 676 893 A2 | 10/1995 |
|----|---|---|
| JP | U 63-73792 | 5/1988 |
| JP | A 3-83038 | 4/1991 |
| JP | A 7-219049 | 8/1995 |
| JP | A 8-46899 | 2/1996 |
| JP | A 8-68978 | 3/1996 |
| JP | A 10-307332 | 11/1998 |
| JP | A 11-249070 | 9/1999 |
| JP | A 2000-75409 | 3/2000 |
| JP | A 2000-89360 | 3/2000 |
| JP | A 2000-122174 | 4/2000 |
| JP | A 2000-206614 | 7/2000 |

*Primary Examiner*—Russell Adams
*Assistant Examiner*—Michael Dalakis
(74) *Attorney, Agent, or Firm*—Oliff & Berridge, PLC

(57) ABSTRACT

A screen is arranged substantially in parallel with a yz-plane. A first mirror is placed with its reflection plane substantially perpendicular to the yz-plane and also inclined approximately 45° to an xy-plane. At least an electro-optical device, color combining means, and projection lens are arranged along the xy-plane so that an image-light ray emitted from a color-combining optical system enters the first mirror with its optical-axis parallel to the xy plane and inclined α° with respect to a y-axis. A second mirror is placed substantially perpendicularly to an XZ-plane and also with an inclination of smaller by α/2° than 45° approximately with respect to the yz-plane, so that the image-light ray reflected from the first mirror is reflected by the second mirror again so as to enter the screen with the optical axis being incident on the substantial center of the screen and substantially perpendicular to the screen. Thereby, the positional adjustment of an optical system constituting a projector is facilitated and also the apparatus is miniaturized.

3 Claims, 6 Drawing Sheets

(A)

(B)

(C)

PROJECTOR

TECHNICAL FIELD

The present invention relates to a projector for projecting color images (projection display apparatus).

BACKGROUND ART

As a display having a large viewing surface, projectors for magnifying and projecting images on a screen are widely used. As the projectors known are a front type projector for projecting light rays on a reflection type screen and a rear-type projector for projecting light rays on a transmission type screen. As the rear-type projector, the technique disclosed in Japanese Unexamined Patent Application Publication No. 10-307332 has been exemplified.

In the rear-type projector, a light ray irradiated from a projecting device for projecting images is reflected by a plurality of mirrors so as to be projected on a screen. Of the plurality of mirrors, the reflecting mirror for reflecting the light ray to the screen is generally arranged to have an inclination of less than 45° with respect to the screen, and by reducing the depth from the screen to this mirror, the rear-type projector is miniaturized.

As described above, when arranging the mirror for reflecting a light ray toward the screen, it is necessary to place the projecting device to slant relative to a plane perpendicular to the screen in order to compensate the rotation of an image to be projected on the screen. Accordingly, there is a difficulty in the positional adjustment of an optical system constituting a projector when slanting the projecting device to be placed corresponding to the inclination of the mirror.

The present invention has been made in order to solve the above-described problem in a conventional technique, and it is an object thereof to provide a technique capable of facilitating the positional adjustment of an optical system constituting a projector and also of miniaturizing the apparatus.

DISCLOSURE OF INVENTION

In order to solve at least part of the problem mentioned above, a projector according to the present invention comprises three electro-optical devices for forming images of three color components, a color-combining optical system for forming a color image by combining the images of three color components, a projection lens for projecting a color image formed by the color-combining optical system, a screen onto which the color image is projected, and first and second mirrors disposed on an optical path ranging from a plane of light incidence of the projection lens to a plane of light incidence of the screen for sequentially reflecting image light representing the color image emitted from the color-combining optical system. Furthermore, when three axes orthogonal to each other are referred to as an x-axis, a y-axis, and a z-axis, the screen is placed substantially in parallel with a yz-plane, and the color-combining optical system, having two kinds of dichroic surfaces arranged substantially in an X-shape, is placed so that a line of intersection between the two kinds of dichroic surfaces is to be substantially parallel to the z-axis. Also, each of the electro-optical devices, having a substantially rectangular image-forming region, is placed so as to face a corresponding plane of incidence out of three planes of incidence parallel to the line of intersection of the color-combining optical system so that the direction of the longer side of the image-forming region agrees with the direction of the line of intersection. Moreover, a reflection surface of the first mirror is arranged substantially perpendicularly to the yz-plane and also with an inclination of approximate 45° relative to an xy-plane, and at least the electro-optical devices, the color combining optical system, and the projection lens are arranged along the xy-plane so that an image light emitted from the color-combining optical system enters the first mirror with its optical-axis parallel to the xy-plane and inclined α° with respect to the y-axis. Also, the second mirror is placed substantially perpendicularly to an xz-plane with an inclination of smaller by α/2° than 45° approximately with respect to the yz-plane so that an image light reflected from the first mirror is reflected by the second mirror again so as to enter the screen with the optical axis being incident on the substantial center of the screen and substantially perpendicular to the screen.

In the projector according to the present invention, the second mirror for reflecting image light from the first mirror to be incident on the screen can be arranged substantially perpendicularly to the xz-plane with an inclination of smaller by α/2° than 45° approximately with respect to the yz-plane, so that the depth from the screen to the second mirror can be reduced. Thereby, the apparatus can be miniaturized. At least the electro-optical device, color combining system, and projection lens are arranged along a plane substantially perpendicular to the screen (horizontal plane, for example), so that the arrangement or positional adjustment involved in the arrangement of these optical components can be facilitated. Therefore, in the projector according to the present invention, the arrangement of the optical system constituting the projector can be facilitated, and the apparatus can be miniaturized as well.

In the projector described above, the first mirror may be preferably integrally arranged with the projection lens.

By such a structure, the arrangement space for the first mirror can be reduced, so that the apparatus can be miniaturized. In addition the meaning of "being integrally arranged" includes not only being integrally arranged combined with the vicinity of the incidence plane or the emission plane of the projection lens but also being arranged within the projection lens.

Wherein the first mirror may be preferably formed of a total reflection prism.

By such a structure, the reflectance of the first mirror can be increased and bright projection images can be readily achieved.

BEST MODE FOR CARRYING OUT THE INVENTION

Embodiments according to the present invention will be described with examples.

Figure 1:
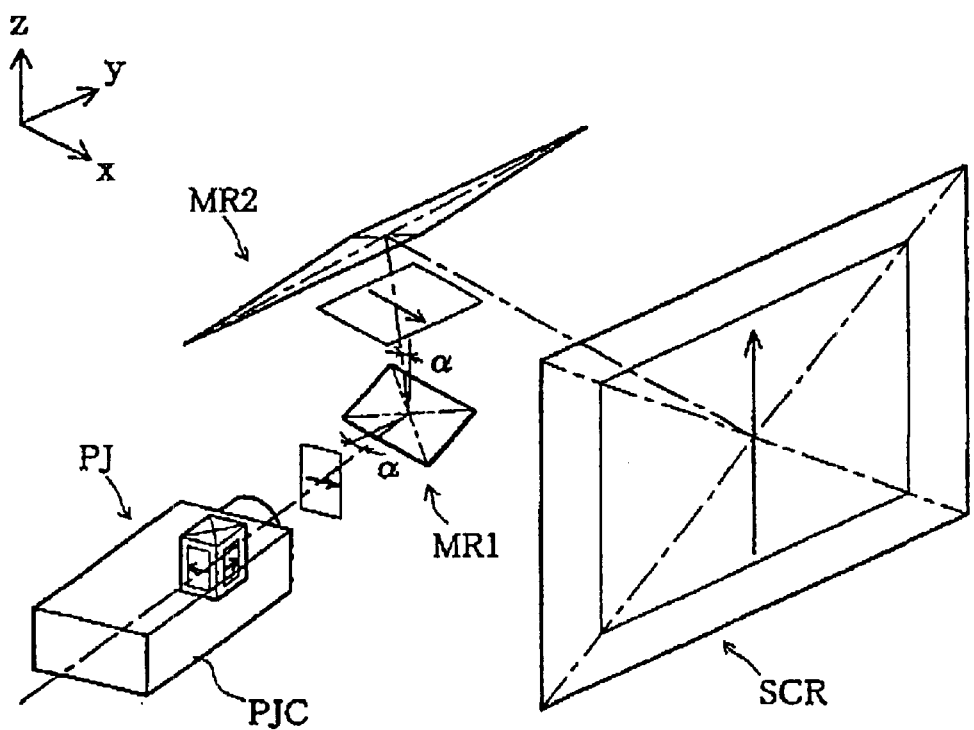
FIG. 1 is a perspective view showing a schematic structure of a rear projector according to an embodiment of the present invention.

FIG. 1 is a perspective view showing a schematic configuration of a rear projector (backproject-type display) according to an embodiment of the present invention. Symbols x, y, and z represent three axes orthogonal to each other.

A rear projector 10 comprises a projection unit PJ, two projection-light reflection mirrors MR1 and MR2, and a rear screen SCR. A projection light-ray emitted from the projection unit PJ is reflected by the first and second projection-light reflection mirrors MR1 and MR2 to form projected images on the rear screen SCR.

In addition, the positional relationship between the projection unit PJ, the first and second projection-light reflection mirrors MR1 and MR2, and the rear screen SCR will be described later.

A. Projection Unit PJ

Figure 2:
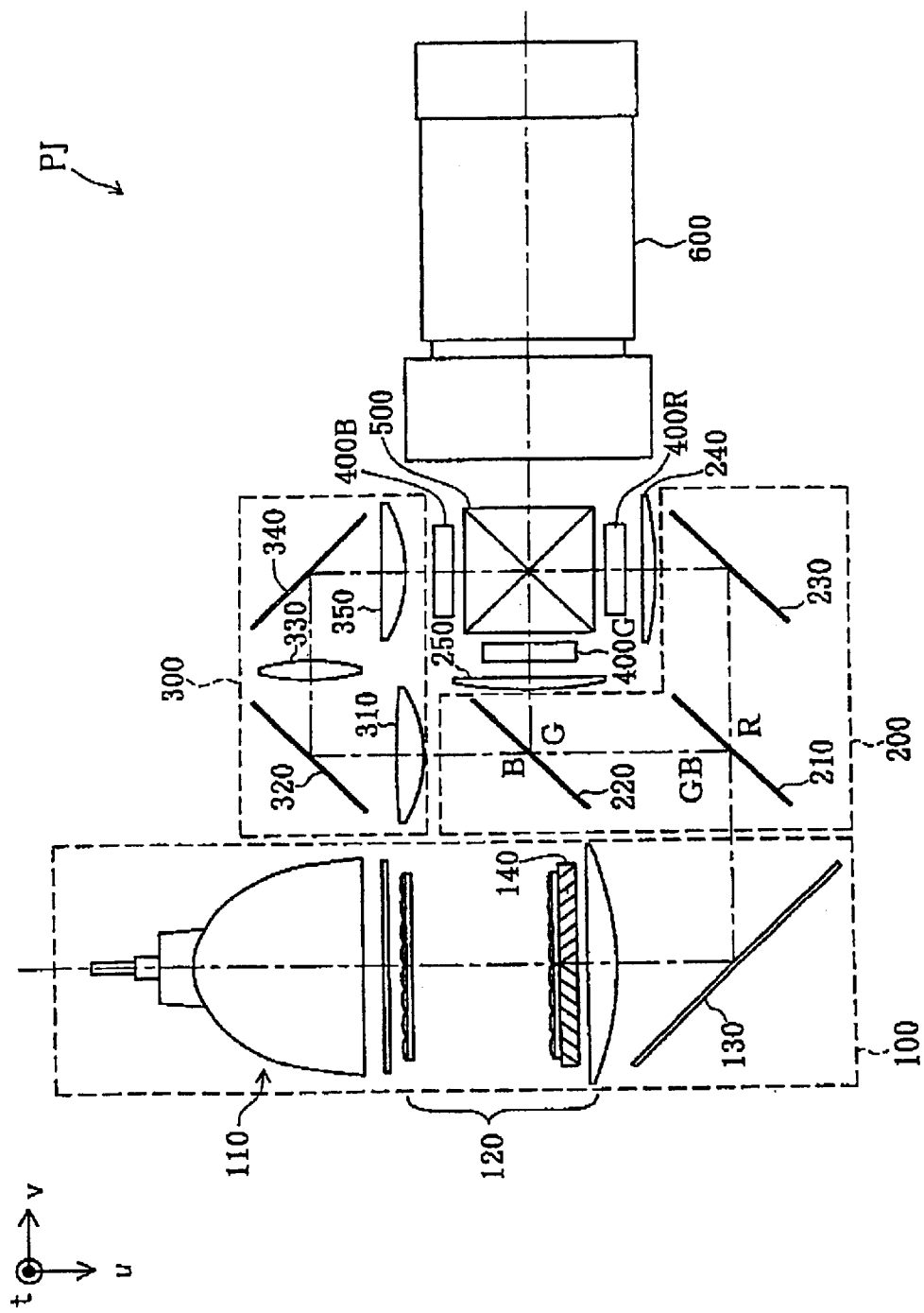
FIG. 2 is a plan view showing a schematic structure of an optical system of a projection unit PJ.

FIG. 2 is a plan view showing a schematic configuration of an optical system of the projection unit PJ. Symbols u, v, and t represent three axes orthogonal to each other. The projection unit PJ comprises an illumination optical system 100, a color light separation optical system 200, a relay optical system 300, three light valves 400R, 400G, and 400B, a cross-dichroic prism 500, and a projection lens 600.

Each constituent component is arranged along a uv-plane about the cross-dichroic prism 500 as its center.

The illumination optical system 100 comprises a light source 110, an integrator optical system 120, and an illumination-light reflection mirror 130. A light ray emitted from the light source 110 uniformly illuminates the light valves 400R, 400G, and 400B, which are to be illuminated, via the integrator optical system 120. The illumination-light reflection mirror 130 has a function to reflect an illumination-light ray emitted from the integrator optical system 120 toward the color light separation optical system 200. The illumination-light reflection mirror 130 may be also arranged on an optical path within the integrator optical system 120. In addition, the illumination-light reflection mirror 130 may be omitted depending on the positional arrangement of the light source 110 and the integrator optical system 120. A polarization-conversion optical system 140 has a function to convert a non-polarization light ray into polarized light-rays having polarization directions capable of being used in the light valves 400R, 400G, and 400B.

The color light separation optical system 200 comprises two dichroic mirrors 210 and 220 and a reflection mirror 230, and has a function to separate illumination light emitted from the illumination optical system 100 into three color-light rays, each having a different wavelength region.

The first dichroic mirror 210 transmits a red-light ray (R-light ray) therethrough while reflecting color-light rays having smaller wavelengths than that of the transmitted light ray (a green-light ray (G-light ray) and blue-light ray (B-light ray)). The R-light ray transmitted through the first dichroic mirror 210 is reflected by the reflection mirror 230 to enter the light valve 400R for the R-light ray via a field lens 240.

The G-light ray of the G- and B-light rays reflected by the first dichroic mirror 210 is reflected by the second dichroic mirror 220 to enter the light valve 400G for the G-light ray through a field lens 250. On the other hand, the B-light ray is transmitted through the second dichroic mirror 220 to enter the light valve 400B for the B-light ray via the relay optical system 300, that is an incidence-side lens 310, a first relay reflection-mirror 320, a relay lens 330, a second relay reflection-mirror 340, and an emission-side lens 350. The reason for using the relay optical system 300 for the B-light ray is to prevent light utilization efficiency from being reduced by light diffusion, etc., because the optical path length of the B-light ray is larger than those of other color-light rays.

The light valves 400R, 400G, and 400B for the respective colors modulate the respective incident color-light rays according to the corresponding color signal (image information) so as to emit the modulated light-rays as transmitted light-rays. As such a transmission-type light valve, a transmission-type liquid crystal panel disposed between a pair of polarizing plates is used. At this time, the pair of polarizing plates may be bonded on the transmission-type liquid-crystal panel, or may be separated from the transmission-type liquid-crystal panel by being bonded on the other optical component. In addition, these light valves 400R, 400G, and 400B are equivalent to an electro-optical device according to the present invention, and an image represented by a modulated light-ray for each color is equivalent to an image of color component for each color constituting a color image.

Figure 3:
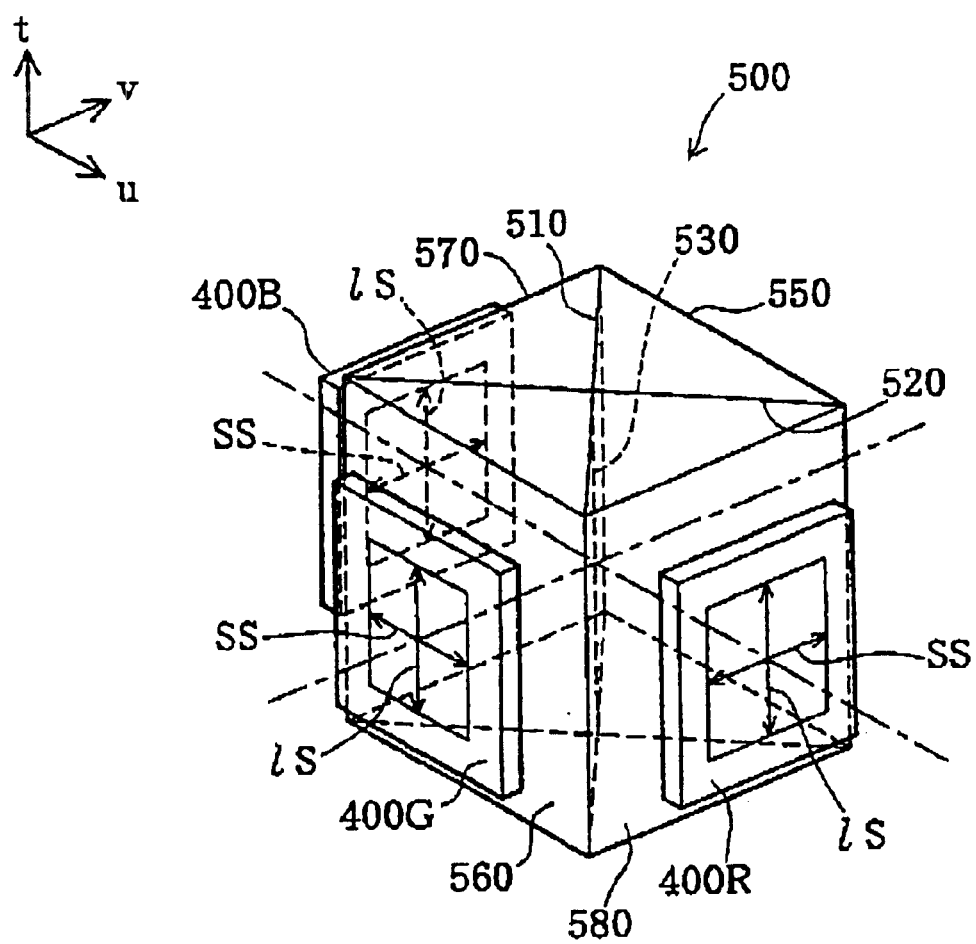
FIG. 3 is a schematic perspective view showing a cross-dichroic prism 500 and light valves 400R, 400G, and 400B for the respective colors.

FIG. 3 is a schematic perspective view showing the cross-dichroic prism 500 and the light valves 400R, 400G, and 400B for the respective colors. The cross-dichroic prism 500 is placed so that a line of intersection 530 between a first dichroic surface 510 and a second dichroic surface 520 is to be perpendicular to the uv-plane. Also, it is placed so that a first side-face, i.e., an emitting surface 550, and a second side-face 560 of four side-faces 550, 560, 570, and 580 are to be parallel to a ut-plane, and the third and fourth side-faces 570 and 580 are to be parallel to a vt-plane. The second to fourth side-faces 560, 570, and 580 are provided with the light valves 400G, 400B, and 400R for the respective colors, respectively. These light valves 400G, 400B, and 400R are longitudinally placed so that the direction of the longer side (longer side direction) ls of a substantially rectangular image-forming region (light-illumination surface) agrees with the direction of the line of intersection 530 (intersection direction), i.e., a t-direction. Such an arrangement may also be referred to as a "longitudinal arrangement" below. In addition, the direction of the shorter side (shorter side direction) ss of the image-forming region (light-illumination surface) is arranged so as to be orthogonal to the direction of the line of intersection 530 (intersection direction), i.e., to be orthogonal to the t-direction.

The R-light ray emitted from the light valve 400R for R-light is reflected by the first dichroic surface 510 and emitted from the emitting surface 550. Also, the B-light ray emitted from the light valve 400B for B-light is reflected by the second dichroic surface 520 and emitted from the emitting surface 550. Furthermore, the G-light ray emitted from the light valve 400G for G-light is transmitted through the first and second dichroic surfaces 510 and 520, and is emitted from the emitting surface 550. Thereby, the three-color rays modulated by the light valves 400R, 400G, and 400B for the respective colors are combined in the cross-dichroic prism 500. A color image represented by the combined modulated-light rays is projected by the projection lens 600. However, the color image combined in the cross-dichroic prism 500 is sidewise directed in the +u or −u direction corresponding to the longitudinal arrangement of the light valves 400R, 400G, and 400B. In addition, the image light representing the color image is emitted from the projection lens 600 in the +v direction.

The detailed description of the configuration and function of each component of the projector shown in FIG. 2 is omitted in this application because they are disclosed in detail, for example, in Japanese Unexamined Patent Application Publication No. 10-177151 and Japanese Unexamined Patent Application Publication No. 10-186548, which are disclosed by the applicant of the present invention. In addition, as a color-combining optical system, instead of the cross-dichroic prism, in which a dichroic surface is formed on a prism, a cross-dichroic mirror, in which a dichroic surface is formed on a transparent flat plate, may be used.

Figure 4:
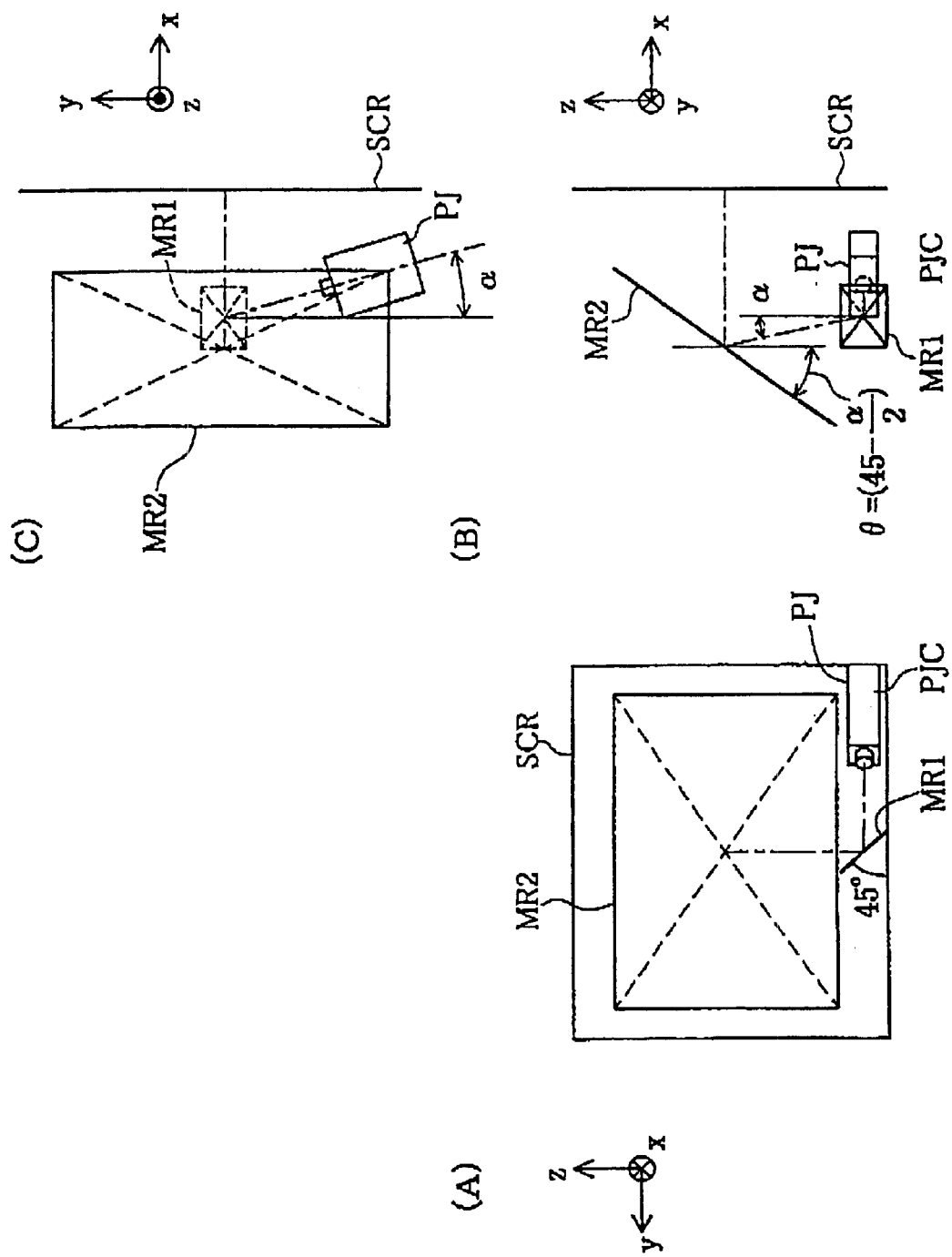
FIG. 4 includes schematic illustrations showing the positional relationship between the projection unit PJ, projection-light reflection mirrors MR1 and MR2, and a rear screen SCR.

B. Positional Relationship between Projection Unit PJ, Projection-light Reflection Mirrors MR1 and MR2, and Rear Screen SCR FIG. 4 is a schematic representation for illustrating the positional relationship between the projection unit PJ, projection-light reflection mirrors MR1 and MR2, and rear Screen SCR. FIG. 4(A) to FIG. (C) show a rear view, left side-view, and plan view of a rear projector 10, respectively. In addition, for facilitating description, the optical axial direction of image light will be described as the image-light direction below.

The rear screen SCR is placed substantially in parallel with a yz-plane. The projection unit PJ is arranged so that the bottom of a casing PJC thereof is to be in parallel with an xy-plane. In addition, each component of the projection unit PJ shown in FIG. 2 is arranged within the casing PJC along a planar surface parallel to the bottom of the casing PJC.

However, the projection unit PJ, as shown in FIG. 4(A) and FIG. 4(C), is placed so that a projection light-ray (shown by the dash-dot lines in FIG. 4) emitted from the projection unit PJ is incident on the first projection-light reflection mirror MR1 in parallel with the xy-plane and with an inclination of $\alpha°$ with respect to a y-axis. Accordingly, a u-axis in FIG. 2 is inclined $\alpha°$ with respect to an x-axis while a v-axis in FIG. 2 is inclined $\alpha°$ with respect to a y-axis. In addition, a t-axis in FIG. 2 is parallel to a z-axis.

The first projection-light reflection mirror MR1, as shown in FIG. 4(A), is placed substantially perpendicularly to the yz-plane and also with an inclination of approximate 45° relative to the xy-plane.

The second projection-light reflection mirror MR2, as shown in FIG. 4(B), is placed substantially perpendicularly to an xz-plane and also with an inclination of $\theta(=45-\alpha/2)°$, which is $\alpha/2°$ smaller than approximate 45°, with respect to the yz-plane. Where, for $\theta$ must be larger than zero, $\alpha$ has a value more than zero and less than 90.

In addition, the positional relationship between the first and second projection-light reflection mirrors MR1 and MR2 is that normal lines of the respective reflection surfaces are not intersected with each other so as to be in a staggered arrangement.

A projection light-ray emitted from the projection unit PJ is reflected by the first projection-light reflection mirror MR1 to enter the second projection-light reflection mirror MR2 in parallel to the xz-plane and also with an inclination of ac with respect to the z-axis, as shown in FIG. 4(A) and FIG. 4(B). A projection light-ray reflected by the second projection-light reflection mirror MR2, as shown in FIG. 4(B) and FIG. 4(C), enters the rear screen SCR in parallel to the x-axis.

By the projection unit PJ and the two projection-light reflection mirrors MR1 and MR2 arranged as described above, a projection-light ray from the projection unit PJ is reflected by the first and second projection-light reflection mirrors MR1 and MR2 so as to enter the rear screen SCR.

The two projection-light reflection mirrors MR1 and MR2 rotate an image by 90° so as to bring the direction of the longer side on the picture plane of the image projected by the projection unit PJ to agree with the direction of the longer side on the picture plane of the image projected on the rear screen. Consequently, as shown in FIG. 1, the sidewise image indicated by the arrow is rotated so as to be the upward image indicated by the arrow by the two projection-light reflection mirrors MR1 and MR2 positioned in a staggered arrangement, and it is projected on the rear screen SCR.

As described above, in the rear projector 10 according to the embodiment, by keeping the structure that the longer side direction of the image-forming regions of the three light valves 400R, 400G, and 400B in the projection unit PJ is agreed with the direction of the line of intersection 530 of the cross-dichroic prism 500, while arranging each component of the optical system constituting the projection unit PJ along the direction of a plane (xy-plane) perpendicular to the rear screen SCR, a general sidewise image can be projected to be displayed.

Also, in the rear projector 10 according to the embodiment, the inclination $\theta$ of the second projection-light reflection mirror MR2 with respect to the yz-plane can be smaller by $(\alpha/2)°$ than approximate 45°. That is, since the second projection-light reflection mirror MR2 can be raised more than 45° relative to the xy-plane, the depth from the rear screen SCR to the second projection-light reflection mirror MR2 can be reduced.

Therefore, the arrangement or positional adjustment involved in the arrangement of the optical system constituting the rear projector 10 can be facilitated, and the apparatus can be miniaturized as well.

Also, in the rear projector 10 according to the embodiment, an image-light ray from the second projection-light reflection mirror MR2 is to be incident on the screen SCR substantially perpendicularly thereto; however, an image-light ray from the second projection-light reflection mirror MR2 may slantwise enter the screen SCR (the image-light ray is intersected with the x-axis in FIG. 4(B), for example). The present invention may also be applicable to a rear projector having such a structure. In this case, since the second projection-light reflection mirror MR2 can be raised furthermore, further reduction of the thickness of the rear projector can be achieved.

In addition, as is understood from the description above, the first projection-light reflection mirror MR1 is equivalent to a first mirror according to the present invention and the second projection-light reflection mirror MR2 is equivalent to a second mirror according to the present invention.

C. Modifications

In addition, the present invention is not limited to the embodiment and the examples described above; it may be carried into effect in various manners within the spirit and scope of the invention, and the following modifications may be appreciated, for example.

(1) According to the embodiment, the projection unit PJ is described wherein a transmission-type liquid crystal panel is applied thereto as a light valve; however, a reflection-type liquid crystal panel may also be applied to the projector.

Figure 5:
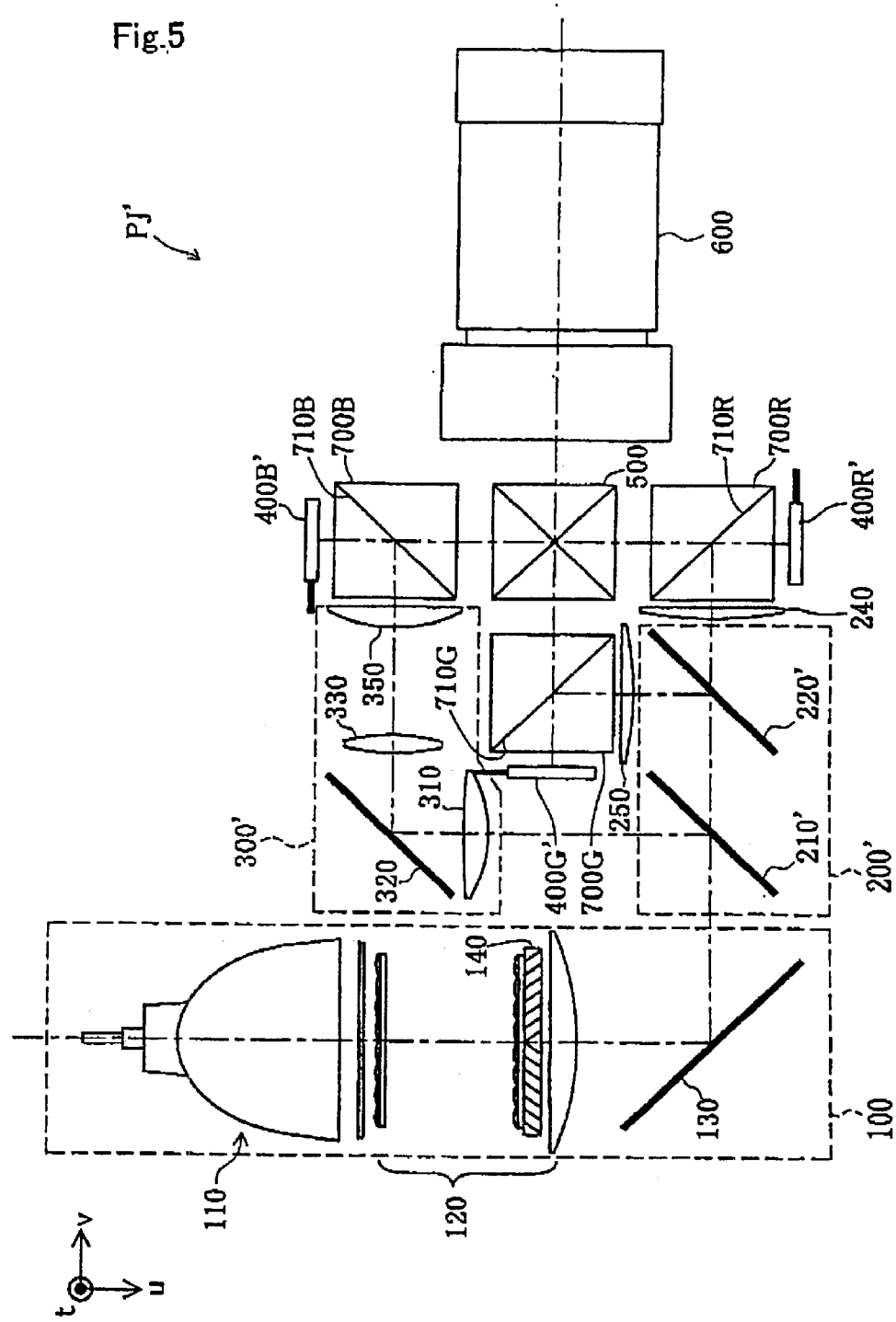
FIG. 5 is a plan view showing a schematic structure of an optical system of a projection unit PJ' using a reflection-type liquid crystal panel as a light valve.

FIG. 5 is a plan view showing a schematic configuration of an optical system of a projection unit PJ' using a reflection-type liquid crystal panel as a light valve. The projection unit PJ' comprises the illumination optical system 100, a color light separation optical system 200', a relay optical system 300', polarization beam splitters 700R, 700G, and 700B, light valves 400R', 400G', and 400B', the cross-dichroic prism 500, and the projection lens 600. Each constituent component is arranged along the uv-plane about the cross-dichroic prism 500 as its center.

A light ray emitted from the illumination optical system 100 enters the color light separation optical system 200' to be separated into three color-light rays. A first dichroic mirror 210' reflects the B-light ray therefrom while reflecting color-light rays having larger wavelengths than that of the B-light ray (G-light ray and R-light ray). The R-light ray of the G- and R-light rays transmitted through the first dichroic mirror 210', is also transmitted through a second dichroic mirror 220' to enter the polarization beam splitter 700R for the R-light ray through the field lens 240. The G-light ray is reflected by the second dichroic mirror 220' to enter the polarization beam splitter 700G for the G-light ray through the field lens 250.

The B-light ray reflected by the first dichroic mirror 210' is transmitted through a relay optical system 300', that is the incidence-side lens 310, the relay reflection-mirror 320, and the relay lens 330, and furthermore through the emission-side lens 350, so as to enter the polarization beam splitter 700B for the B-light ray.

Each of the color-light rays incident on the polarization beam splitters 700R, 700G, and 700B for the respective colors is separated into two kinds of polarized light rays (S polarized light and p polarized light) by the corresponding surface of the polarizing-separation surfaces 710R, 710G, and 710B of the respective polarization beam splitters 700R, 700G, and 700B. Light valves 400R', 400G', and 400B' for the respective colors are arranged on an optical axis of one of the polarized light rays emitted from the corresponding slitter of the polarization beam splitters 700R, 700G, and 700B. In the example shown in the drawing, the polarizing-separation surfaces 710R, 710G, and 710B of the respective polarization beam splitters 700R, 700G, and 700B reflect the S polarized light while transmitting the p polarized light, and the light valves 400R', 400G', and 400B' for the respective colors are arranged on the optical axis of the S polarized light. Therefore, each color-light ray of the S polarized light enters the corresponding valve of the light valves 400R', 400G', and 400B' as illumination light.

The light valves 400R', 400G', and 400B' for the respective colors modulate the polarized light incident as the illumination light according to the corresponding color signal (image information) so as to change the polarizing state and emit it. As such reflection-type light valves 400R', 400G', and 400B', reflection-type liquid crystal panels are used.

In addition, the light valves 400R', 400G', and 400B' for the respective colors are longitudinally placed in the same way as the light valves 400G, 400B, and 400R for the respective colors according to the embodiment.

A light ray emitted from each of the light valves 400R', 400G', and 400B' for the respective colors again enters the corresponding color slitter of the polarization beam splitters 700R, 700G, and 700B. The light ray entered again is the combined light including modulated light (the p polarized light) and non-modulated light (the S polarized light). Therefore, only the modulated light of the emitted respective color-light rays is transmitted through the corresponding surface of the polarizing-separation surfaces 710R, 710G, and 710B of the respective polarization beam splitters 700R, 700G, and 700B so as to enter the cross-dichroic prism 500.

Respective color light rays incident on the cross-dichroic prism 500 are combined to form a color image that is projected and displayed by the projection lens 600. However, the color image combined by the cross-dichroic prism 500 is sidewise directed in the +u or –u direction corresponding to the longitudinal arrangement of the light valves 400R', 400G', and 400B' for the respective colors.

Figure 6:
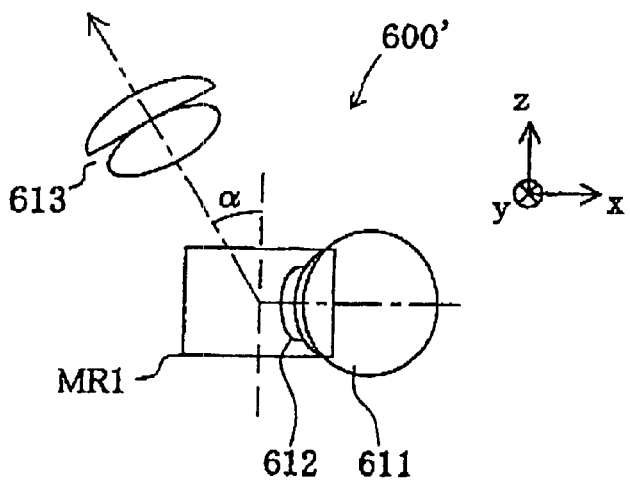
FIG. 6 includes schematic illustrations showing examples of the first projection-light reflection mirror MR1 arranged within a projection lens.
Figure 6:
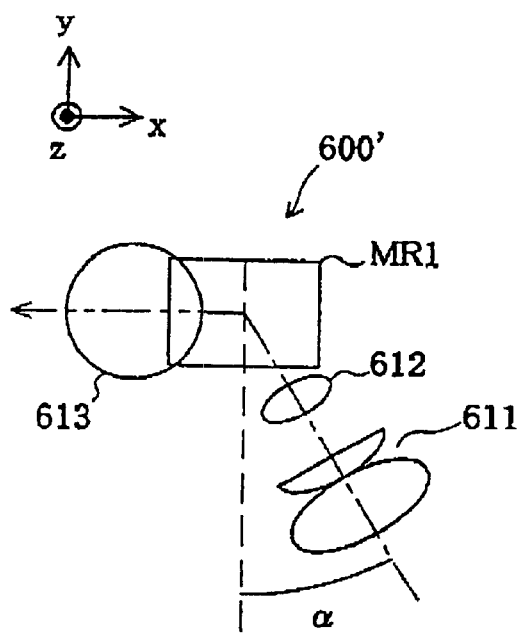
Figure 6:
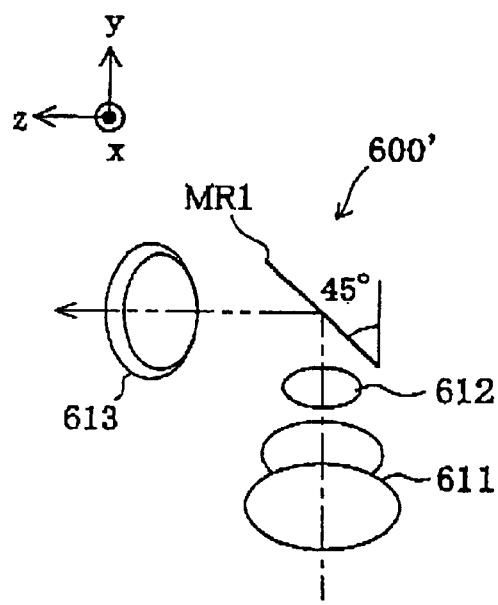

(2) In general, the projection lens is formed of a group of a plurality of lenses for function sharing, and a space, in which a lens is not arranged, exists between the lenses. In consideration of this, the second projection-light reflection mirror MR2 may be integrally arranged on the incidence surface, emission surface, or inside of the projection lens 600. FIG. 6 is a schematic representation illustrating an example that the second projection-light reflection mirror MR2 is arranged within the projection lens.

The projection lens 600' has a structure that the first projection-light reflection mirror MR1 is arranged between a second partial lens 612 and a third partial lens 613 of three partial lenses 611, 612, and 613. Wherein a light ray incident on the projection lens 600' proceeds from the first partial lens 611 toward the third partial lens 613. The first projection-light reflection mirror MR1, as shown in FIG. 6(C), is arranged substantially perpendicularly to the yz-plane and also with an inclination of approximate 450 relative to the xy-plane. The optical axes (shown by the dash-dot lines in FIG. 6) of the first and second partial lenses 611 and 612, as shown in FIG. 6(B) and FIG. 6(C), are arranged in parallel with the xy-plane and also with an inclination of α° relative to the y-axis so as to pass through the center of the reflection surface of the first projection-light reflection mirror MR1. The optical axis (shown by the phantom lines in FIG. 6) of the third partial lens 613, as shown in FIG. 6(A) and FIG. 6(C), is arranged in parallel with the xz-plane and also with an inclination of α° relative to the z-axis so as to pass through the center of the reflection surface of the first projection-light reflection mirror MR1.

When using such a projection lens 600', since the arrangement space for the first projection-light reflection mirror MR1 can be reduced, the miniaturization of the rear projector can be furthermore achieved. In addition, when arranging the first projection-light reflection mirror MR1 within the projection lens, the projection-light reflection mirror may be preferably formed of a total reflection prism. When employing the total reflection prism, reflectance of the mirror part can be increased so that bright projection images are achieved.

In addition, the first projection-light reflection mirror MR1 may also be arranged between the first and second partial lenses 611 and 612. Also, the projection lens 600' has been described as having the three partial lenses; however, it is not limited to these, and various projection lenses may be used. That is, it is sufficient to arrange the first projection-light reflection mirror MR1 at any position within the projection lens.

Also, the first projection-light reflection mirror MR1 is not necessarily arranged within the projection lens, and it may also be integrally arranged with the projection lens on the incidence side of the first partial lens 611 or on the emission side of the third partial lens 613.

What is claimed is:

1. A projector, comprising:

three electro-optical devices that form images of three color components;

a color-combining optical system that forms a color image by combining the images of the three color components;

a projection lens that project the color image formed by the color-combining optical system;

a screen, onto which the color image is projected; and first and second mirrors disposed on an optical path ranging from a plane of incidence of the projection lens to a plane of incidence of the screen that sequentially reflect image light representing the color image emitted from the color-combining optical system, wherein, when three axes orthogonal to each other are referred to as an x-axis, a y-axis, and a z-axis, the screen is placed substantially in parallel with a yz-plane, the color-combining optical system, having two kinds of dichroic surfaces arranged substantially in an X-shape, being placed so that a line of intersection between the two kinds of dichroic surfaces is to be substantially parallel to the z-axis, each of the electro-optical devices, having a substantially rectangular image-forming region, being placed so as to face a corresponding plane of incidence out of three planes of incidence parallel to the line of intersection of the color-combining optical system so that a direction of a longer side of the image-forming region agrees with the direction of the line of intersection, a reflection surface of the first mirror being arranged substantially perpendicularly to the yz-plane, and also with an inclination of approximate 45° relative to an xy-plane, at least the electro-optical devices, the color combining optical system, and the projection lens being arranged along the xy-plane so that the image light emitted from the color-combining optical system enters the first mirror with an optical-axis parallel to the xy-plane and inclined $\alpha°$ with respect to the y-axis, and the second mirror being placed substantially perpendicularly to an xz-plane, and also with an inclination of smaller by $\alpha/2°$ than 45° approximately with respect to the yz-plane so that the image light reflected from the first mirror is reflected by the second mirror again so as to enter the screen with an optical axis being incident on a substantial center of the screen and substantially perpendicular to the screen.

2. The projector according to claim 1, the first mirror being integrally arranged with the projection lens.

3. The projector according to claim 2, the first mirror being formed of a total reflection prism.

* * * * *